(12) United States Patent
Denmead et al.

(10) Patent No.: US 11,724,538 B2
(45) Date of Patent: Aug. 15, 2023

(54) RIM FIBRE ARCHITECTURE OF A COMPOSITE WHEEL

(71) Applicant: CARBON REVOLUTION LIMITED, Waurn Ponds (AU)

(72) Inventors: Ashley James Denmead, Belmont (AU); Haydn Law, Fremantle East (AU); Timothy Corbett, Highton (AU); Matthew Edward Dingle, Drysdale (AU); Eden Kwok, Albion (AU); Barry Trippit, Glen Iris (AU)

(73) Assignee: Carbon Revolution Limited, Victoria (AU)

( * ) Notice: Subject to any disclaimer, the term of this patent is extended or adjusted under 35 U.S.C. 154(b) by 416 days.

(21) Appl. No.: 16/639,508

(22) PCT Filed: Aug. 16, 2018

(86) PCT No.: PCT/AU2018/050871
§ 371 (c)(1),
(2) Date: Feb. 14, 2020

(87) PCT Pub. No.: WO2019/033169
PCT Pub. Date: Feb. 21, 2019

(65) Prior Publication Data
US 2020/0406672 A1    Dec. 31, 2020

(30) Foreign Application Priority Data

Aug. 18, 2017   (AU) .............................. 2017903325

(51) Int. Cl.
*B60B 5/02*   (2006.01)
*B60B 21/02*  (2006.01)
(Continued)

(52) U.S. Cl.
CPC .............. *B60B 5/02* (2013.01); *B29C 70/302* (2021.05); *B29C 70/304* (2021.05);
(Continued)

(58) Field of Classification Search
CPC ......... B60B 5/02; B60B 21/023; B60B 21/04; B60B 21/104; B60B 2310/242; B60B 2360/3416; B60B 2360/348
See application file for complete search history.

(56) References Cited

U.S. PATENT DOCUMENTS 2,851,768 A  *  9/1958  Ellis ....................... B25B 27/00
                                                  81/53.2
4,721,342 A      1/1988  Daniels et al.
(Continued)

FOREIGN PATENT DOCUMENTS

CA            2851768 A1 *  5/2013   ............. B32B 17/02
WO    WO-2010/024495 A1    3/2010
(Continued)

*Primary Examiner* — Scott A Browne
(74) *Attorney, Agent, or Firm* — RatnerPrestia

(57) ABSTRACT

A rim portion of a composite wheel comprises a shaped annulus formed about a central axis of rotation of the composite wheel and having a circumferential axis extending circumferentially about the central axis and around the rim portion, said rim portion having a fibre layup comprising a stacked laminate formed from alternating layers of: a hoop tow layer comprising elongate fibre tow in which the fibres are substantially aligned with the circumferential axis of the rim portion, the hoop tow layer being formed from at least one annularly wound elongate fibre tow; and a bias ply layer comprising at least one fibre ply in which the fibres are substantially orientated at an angle of +Θ or −Θ to the circumferential axis of the rim portion, wherein Θ is from 26° to 40°.

25 Claims, 9 Drawing Sheets

(51) Int. Cl.
 *B60B 21/04* (2006.01)
 *B60B 21/10* (2006.01)
 *B29C 70/30* (2006.01)

(52) U.S. Cl.
 CPC ............ *B60B 21/023* (2013.01); *B60B 21/04* (2013.01); *B60B 21/104* (2013.01); *B60B 2310/242* (2013.01); *B60B 2360/348* (2013.01); *B60B 2360/3416* (2013.01)

(56) References Cited

U.S. PATENT DOCUMENTS

| | | | |
|---|---|---|---|
| 5,985,072 A | 11/1999 | Finck et al. | |
| 6,347,839 B1 * | 2/2002 | Lew | B60B 21/062 301/95.102 |
| 9,616,705 B2 | 4/2017 | Burlefinger et al. | |
| 2014/0191566 A1 | 7/2014 | Burlefinger et al. | |
| 2014/0346847 A1 | 11/2014 | Werner et al. | |
| 2016/0303902 A1 | 10/2016 | Snyder | |
| 2016/0332391 A1 * | 11/2016 | Werner | B29C 70/32 |
| 2017/0087929 A1 | 3/2017 | Walls-Bruck et al. | |

FOREIGN PATENT DOCUMENTS

| | | |
|---|---|---|
| WO | WO-2010/141350 A1 | 12/2010 |
| WO | WO-2014/165895 A1 | 10/2014 |
| WO | WO-2015/162173 A1 | 10/2015 |

\* cited by examiner

RIM FIBRE ARCHITECTURE OF A COMPOSITE WHEEL

CROSS-REFERENCE TO RELATED APPLICATIONS

The present application is a U.S. National Stage of International Application No. PCT/AU2018/050871, filed on Aug. 16, 2018, which claims priority from Australian Provisional Patent Application No. 2017903325, filed on Aug. 18, 2017, the contents of which should be understood to be incorporated into this specification by this reference.

TECHNICAL FIELD

The present invention generally relates to the fibre architecture and layup of the rim portion of a composite wheel. The invention is particularly applicable to composite carbon fibre wheels for vehicles and/or aeroplanes and it will be convenient to hereinafter disclose the invention in relation to that exemplary application. However, it is to be appreciated that the invention is not limited to that application and could be used to connect face and rim portions of a large variety of wheels.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

A composite wheel generally includes two main sections, a rim portion and a face portion. The rim portion comprises an annulus structure configured to receive and seat a tyre. The face portion includes a hub which is used to fix the wheel to the vehicle, and a connection structure such as a series of spokes or a disc which extends between and interconnects the hub and the rim. Lateral, vertical and torsional loads are transmitted through the tyre to the rim portion of the wheel which then produce bending and torsional stresses in the connection structure.

The Applicant has produced a one-piece composite wheel, which is described, for example, in International Patent Publication WO2010/024495A1. The creation of a one-piece composite wheel generally necessitates use of a separate rim portion mould and associated reinforcement and face portion mould and associated reinforcement. The separate rim and face mould portions are then interconnected in a final moulding process which allows the overall composite wheel to be integrally formed.

A stiff and strong rim portion is desired to provide a mechanically efficient structure having optimal radial impact performance and stiffness to assist in the transmission of loads generated between the tyre and road, through the rim and to the spokes.

The formation of a rim portion of a composite wheel can be a relatively slow, manual and labour intensive process where rim tools and moulds are used to assist the manual layup of fibre sheets, ply, tows, mats and/or preforms prior to injection of the resin in the final moulding process. Moreover, the use of a plurality of multi-axial plies (for example a dual or tri-axial fibre oriented ply) in conjunction with tow in a rim layup can create undesirable variations in product quality through the misalignment of plies and tow, separation or spacing of butt joints of adjacent plies and thickness variations in the after-preformed part, including excessive thickness leading to wrinkles in the layup once compressed in the final moulding process. Such variations can lead to sub-optimal mechanical properties, including stiffness and radial impact performance in the formed rim portion.

Examples of rim portions of a composite wheel that are formed using the manual layup of fibre sheets, ply, tows, mats and/or preforms include:

International Patent Publication WO 2010/141350 A1 which teaches a composite rim for a bicycle, comprising an open cavity and a closed cavity, with a curved tire-accommodating surface located within the closed cavity. The layup of the wheel involves the successive layering of multiple fibre plys (sheets) of unidirectional material with an initial ply of unidirectional material laid within the inner diameter portion of a mould with the fibres extending in the same direction as the circumference of the rim at a 0° angle. Subsequent plys of unidirectional material are laid upon the initial ply at 0°, 0°, +45°, +45°, +45°, −45°, −45°, −45°, +90°, +90°, +90°, −90°, −90°, and −90° angles relative to the circumference.

United States Patent Publication No. 2014/0191566 A1 teaches a fibre-reinforced plastic material rim formed from several layers of a fibre-reinforced semi-finished plastic product. The rim conventionally consists of a rim well, whose two sides are adjoined by a rim shoulder, which transitions into a rim flange. The rim well is formed by several layers of a base laminate, which extends to the rim flange, between which layers further layers are inserted in the area of the rim shoulder as well as of the rim flange. The layup of the rim comprises a conventional ply layering procedure using fibre-reinforced semi-finished plastic plys or sheets to form a layered laminate. This layup has a first bottom layer ply placed on a pre-forming tool in which the fibres are aligned essentially tangentially, i.e. in the circumferential direction of the rim. An additional lower layer is placed on this lowest layer having the fibres aligned in the axial direction of the wheel, i.e. perpendicularly to the circumferential direction of the rim. Thereafter, several layers of fibre-reinforced semi-finished plastic product, placed on one another, are applied in which the fibres are aligned essentially tangentially. Finally, at least one of the upper layers of the base laminate is applied.

Each of the above prior art fibre architectures form laminates consisting of layers of preformed sheets or plys of fibre. However, the exclusive use of fibre sheets or plies limits the configuration of the fibre layup and architecture, and the type of processes that can be used to layup of those fibre sheets or plys.

It would therefore be desirable to provide an improved or alternate architecture for the rim portion of a composite wheel.

SUMMARY OF THE INVENTION

A first aspect of the present invention provides a rim portion of a composite wheel of a vehicle, the rim portion comprising a shaped annulus formed about a central axis of rotation of the composite wheel and having a circumferential axis extending circumferentially about the central axis and around the rim portion, said rim portion having a fibre layup comprising a stacked laminate formed from alternating layers of:

a hoop tow layer comprising elongate fibre tow in which the fibres are substantially aligned with the circumferential axis of the rim portion, the hoop tow layer being formed from at least one annularly wound elongate fibre tow; and a bias ply layer comprising at least one fibre ply in which the fibres are substantially orientated at an angle of +Θ or −Θ to the circumferential axis of the rim portion, wherein Θ is from 26° to 40°.

Another aspect of the present invention provides a fibre layup of a rim portion of a composite wheel of a vehicle having a face portion and rim portion, the rim portion comprising a shaped annulus formed about a central axis of rotation of the composite wheel and having a circumferential axis extending circumferentially about the central axis and around the rim portion, said fibre layup comprising a stacked laminate formed from alternating layers of:

a hoop tow layer comprising elongate fibre tow in which fibres are substantially aligned with the circumferential axis of the rim portion, the hoop tow layer being formed from at least one annularly wound elongate fibre tow;

a bias ply layer comprising at least one fibre ply in which the fibres are substantially orientated at an angle of +Θ or −Θ to the circumferential axis of the rim portion, wherein Θ is from 26° to 40°.

The present invention provides a new fibre architecture in the rim portion of a composite wheel for a vehicle. The resulting laminate stack comprises consecutive layers providing a repetition pattern or sequence of the combination of 0°, +Θ° and −Θ° fibre orientation angles relative to the circumferential axis of the rim portion. The layers of the layered structure have fibres that are orientated in a direction which adds strength to the structure of the rim portion of the composite wheel. The hoop tow layer is comprised of at least one annularly wound elongate fibre tow, and therefore provides stiffness in the barrel or annulus shape of the rim portion. Furthermore, each hoop tow layer constrains the adjacent bias ply layer so that laminate thickness can be controlled. The change of fibre architecture from traditional or conventional ply based layups, for example 90 deg plys (such as taught in the background) to the bespoke layup of the present invention therefore leads to improved impact, durability and stiffness performance.

Applicant notes that the selection of fibre direction of the hoop tow layer and bias ply layer has been carefully designed to provide a synergistic effect between the layers to improve the stability and strength of the overall rim structure. The selected fibre orientation angles in combination with the choice of layer material provide the rim portion with improved impact, durability and stiffness performance.

A desirable radial impact performance is provided through the use of wound hoop tow layer providing resistance to damage and the laminate structure providing a stacked structure of thin ply layers extending through the thickness of the laminate. Radial impact can also be improved through the absence of butt joins where possible. The use of the hoop tow layer and bias ply layers provide a desirable stiffness to the rim portion.

Due to the improved mechanical efficiency/performance, a thinner rim laminate may be possible compared to other current carbon fibre wheel architectures, leading to a comparatively lighter wheel.

It should be understood that the term composite herein denotes any type of composite material comprising fibres, cured or uncured, irrespective of the structure being layered or not. Furthermore, pre-forms and pre-consolidated pre-forms cured or uncured are important subgroups of composite materials and bodies.

It should also be understood that tows or fibre tows are bundles of a large number of individual fibres, for example 1000's, 10000's or 100000's of fibres. Tow-pregs are at least partially impregnated fibre tows. Accordingly, the hoop tow layer comprises a tow/fibre tow which is annularly wound around the annulus shape of the rim portion to form at least one hoop of aligned fibres therein about the central axis. In preferred forms, the hoop layer comprises a hoop wound layer formed from a longitudinally elongate tow that is annularly wound multiple times around the annulus shape of the rim portion.

It should also be understood that ply or plies refers to a sheet or layer of fibres formed or otherwise connected together. A bias ply therefore refers to a sheet or layer of fibres in which the fibres are orientated (or biased) in a specific direction within that sheet. Bias plies typically substantially comprise unidirectional fibres i.e. fibres aligned or orientated in a single direction—along or parallel to a single axis.

It is also to be understood that a pre-form is a composite material comprising fibres. In some instances the preform may also include an uncured matrix material such as a resin. Some preforms may substantially comprise dry fibres with no matrix material. A binder may be used to assist holding the plies together before the matrix material has been injected.

A wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these. In a preferred embodiment, the first set of fibres and the second set of fibres comprise carbon fibres.

The fibres in parts of the layup (where not specifically specified) may be provided in any suitable form including in prepregs, semi-pregs, woven or non-woven fabrics, mats, pre-forms, pre-consolidated pre-forms, individual or groups of fibres, tows, tow-pregs, or the like. The fibres are preferably provided in layers of oriented fibres, for example individual or groups of fibres, fibre tows, fibre tow-pregs, prepregs, semi-pregs, woven or non-woven fabrics or mats as specified.

It is to be understood that prepreg refers to a substantially or fully impregnated collection of fibres, fibre tows, woven or non-woven fabric or the like. Similarly, it is to be understood that semi-preg refers to a partially impregnated collection of fibres or fibre tows. The partial impregnation provides for enhanced removal of gas through or along the dry fibres during consolidation and/or curing. An example of a semi-preg is a partially impregnated layer of fibres.

It is to be understood that woven and non-woven fabrics are collections of individual fibres or fibre tows which are substantially dry, i.e. not impregnated by a matrix material, such as resin.

The hoop tow layer provides a fibre orientated or aligned with the circumferential axis of the rim portion. This provides hoop strength to the rim portion. The bias plies provide angled orientated or aligned fibres, providing strength lateral reinforcement to the structure of the rim. The angle Θ to which those fibres are angled away from the circumferential axis of the rim portion is between 26° to 40°. In embodiments, angle Θ is from 28° to 40°, preferably 30° to 36°, and more preferably about 33°. The optimal angle can of course be determined by finite element analysis of a model of the rim portion and composite wheel. The specific angle Θ used is dependent on the overall configuration of the composite wheel and the rim portion and requisite loadings and the like.

The hoop tow layer and bias ply layer comprises aligned fibres, i.e. fibres aligned in a particular direction within the rim portion of the composite wheel. These aligned fibres provide a fibre direction to the rim portion in the direction the aligned fibres of those layers extend relative to the circumferential axis of the rim portion. The hoop tow layer preferably provides between 40 to 60%, preferably about 50% of fibre direction in the rim portion. Similarly, the bias ply layer preferably provides between 40 to 60%, preferably about 50% of the fibre direction in the rim portion. In embodiments, this can be achieved by the hoop tow layer comprising between 40 to 60%, preferably about 50% of fibre in the rim portion. Similarly, the bias ply layer may comprise between 40 to 60%, preferably about 50% of the fibre in the rim portion.

The bias plies in the stacked laminate are arranged in the lay up to provide alternating angled fibre directions either side of a hoop tow layer. Consecutive bias ply layers are therefore preferably arranged in the lay up to provide a layer having a fibre orientation angle that is the (+ or −) alternate angle of the fibre orientation of the preceding bias ply layer. Each bias ply layer is preferably sandwiched between adjacent hoop tow layers. The resulting laminate stack therefore comprises consecutive layers providing a repetition of [0°, +Θ°, 0°, −Θ°] fibre orientation angles relative to the circumferential axis of the rim portion.

Bias plies are unidirectional and can be utilised to form over the complex rim geometry whilst still maintaining the requisite fibre alignment/orientation for that layer of the stacked laminate. In some embodiments, the bias plies comprise a sheet of interconnected unidirectional fibre material, preferably interconnected unidirectional tow. That connection can comprise a stitched connection. Such bias plies comprise a stitched unidirectional sheet material, preferably a sheet of stitched unidirectional tow. Whilst single layer bias ply is preferred, the stacked laminate may include one or more two layer bias ply in the layup. Some embodiments may include a two layer bias ply comprising a layer having fibre directions of +(26° to 40°) and a layer having fibre directions of −(26° to 40°) relative to the circumferential axis of the rim portion. Each two layer bias ply would be laminated between hoop tow layers in the stacked laminate. A layer of hoop tows is therefore located between each bias ply layer. Again, each hoop tow layer constrains the adjacent bias ply layer so that laminate thickness is controlled.

In a number of embodiments, the rim portion of the composite wheel includes two annular flanges, an inner flange and an outer flange, at opposing edges of the width of the rim portion. In embodiments, each bias ply comprises a continuous sheet from the inner flange of the wheel to the outer flange of the wheel. Each bias ply layer can therefore be preferably formed without butt joins.

However, it should be appreciated that in alternate embodiments the bias plies may not be continuous between both flanges. If the bias plies are sufficiently short, they may be preformed as a 'patch' of rectangular form that can be picked manually or automatically from a preforming operation and laid up one by one to form a complete layer of bias plies of the same angle on the mandrel. The patches may be overlapped. It should be appreciated that the preforming operation may be that plies are first formed to the correct rim profile using a binder or thermoplastic material that has been pre-applied to the rectangle by clamping the ply in the correct shape and cooling the material to set the binder/ thermoplastic material. The preformed rectangular patch can have the hoop wound tow applied. However, other preforming operations could also be utilised.

The hoop tow layer is formed from at least one annularly wound elongate fibre tow. Whilst a single elongate hoop tow could be wound around and about the central axis to form each hoop tow layer, the hoop tow layer can comprises a plurality, preferably multiple annularly wound of elongate fibre tows. The hoop tow layer is preferably spiral wound with the adjacent edges of the concentric hoops of elongate tow abutting.

The rim portion typically includes annular flanges that radially extend outwardly from or about the distal edges of the rim portion forming the inner flanges and outer flanges. The rim portion also includes at least one annular bead, preferably two (inner safety bead and outer safety bead respectively spaced apart from the inner flange and outer flange) which extends radially outwardly from the surface of the rim that is spaced apart along the width of the rim from one of the annular flanges. The safety beads are used to retain the inner edge of the tyre onto the rim portion. These features can be formed as part of the fibre layup of the stacked laminate by aggregating or building up hoop wound tow at selected locations in the layup. In embodiments, the stacked laminate further comprises contoured features formed from aggregated hoop wound tow. The contoured features preferably extend around the circumference of the rim portion and are built up from annularly wound elongate fibre tow. Contoured features that can be formed using aggregated hoop wound tow include at least one bead, flange, rib, or step. The contoured features can therefore comprise the safety beads (i.e. the inner safety bead and the outer safety bead) and the edge flanges (inner flange and outer flange) of the rim portion.

In some embodiments, the layup of at least one of the inner flange or outer flange includes a reinforcement layer comprising a fibre ply having fibres orientated from 80 to 100 degrees to the circumferential axis of the rim portion, preferably about 90 degree to the circumferential axis of the rim portion. Such additional plies in the inner flange and/or the outer flange assist the prevention of cracking of the laminate in these regions. The reinforcement layer is preferably included in the layup sequence or pattern to provide a hoop tow layer, bias ply layer and reinforcement layer, or a tow layer, bias ply layer tow layer, bias ply layer and reinforcement layer. It should be appreciated that other layup sequences are also possible.

The rim portion can also include a drop center. The drop center preferably comprises a recessed or trench portion of the rim portion adjacent to but spaced away from the outer safety bead. The recess of the drop portion allows the bead of the tyre to be pushed into the recess of the drop center while the other side is pulled over and off the opposing flange.

The recess forming the drop center of the rim portion of the composite wheel can be formed by contouring of a supporting mould face on which the stacked laminate is formed, and/or through selective or reduced application of hoop tow layers in the drop center recess. In embodiments, the rim portion includes a drop center recess comprising an annular section having reduced or less tow than sections adjacent to the drop center recess.

The use of reduced hoop tow can in some instances weaken the rim portion in the drop center recess compared to the surrounding layup. The drop center therefore preferably includes a strengthening fibre structure, and more preferably a strengthening ply layer. In some embodiments, the rim portion can further comprise at least one reinforcement layer located in the drop center recess. The reinforcement layer preferably comprises a fibre ply having fibres orientated from 80 to 100 degrees to the circumferential axis of the rim portion, preferably about 90 degree to the circumferential axis of the rim portion. The use of a reinforcement layer is intended to improve wheel performance under biaxial fatigue test loading. In some embodiments, at least one hoop tow layer is provided over at least the ends of the reinforcement layer.

In embodiments, the base region of the layup between the outer flange and drop recess includes a woven fabric having fibre orientation angles relative to the circumferential axis of the rim portion to the bias ply layer. In some embodiments, this woven fabric has a fibre orientation of + or −30 to 50 degrees relative to the circumferential axis of the rim portion, preferably + or −45 degree relative to the circumferential axis of the rim portion. Preferably, at least two, preferably three layers of woven fabric are used. In embodiments, this woven fabric forms a part of the connection between the rim portion and hub portion of the composite wheel.

The vertical sections or flanges of the contoured shape of the rim portion (i.e. those sections that are radially extending or aligned with the central axis) can be formed with reduced or less tow than sections adjacent thereto for lower interlaminar tension. In these embodiments, radially extending or aligned sections of the rim portion (relative to the central axis) are formed with reduced or less tow than sections adjacent thereto.

The fibre layup or fibre architecture of the rim portion of the present invention comprises a multi-layered structure. The number of layers may vary considerably depending on the design of the rim portion and the size and type of composite members. In some embodiments, only a few layers, for example, 4 to 10 layers, in some embodiments 4 to 20 layers are used. In other embodiments, a higher number, for example 20, 30, 50, 100 or more layers are needed to obtain the desired quality and/or properties of the rim portion.

The fibre density in each layer can be controlled by forming the various layers out of materials of a selected fibre density. The selection of fibre density can influence the mechanical properties of the rim portion and the overall weight. In embodiments, the fibre density in each layer of the stacked laminate is from 50 to 400 $g/m^2$, preferably 150 to 300 $g/m^2$, more preferably from 180 to 250 $g/m^2$, more preferably from 180 to 220 $g/m^2$, yet more preferably about 200 $g/m^2$. It should be appreciated that the fibre density of the hoop tow layer and bias ply layers can be the same or different. However, it is preferred that the fibre density is at least similar, preferably the same to provide consistent fibre density throughout the rim portion.

It should be appreciated that the rim portion preferably further comprises a matrix material enveloping the fibres of the stacked laminate. The matrix material can comprises a resin based on unsaturated polyester, polyurethane, polyvinyl ester, epoxy, thermoplastics, similar chemical compounds or combinations thereof. However, it should be appreciated other matrix materials may also be applicable.

A second aspect of the present invention provides a composite wheel including a rim portion according to the first aspect of the present invention. The rim portion of the composite wheel is preferably integrally formed with a face portion of the composite wheel.

In some embodiments, the composite wheel is formed about a central wheel axis. The face portion comprises second fibres substantially radially aligned relative to the wheel axis and the rim portion is formed from first fibres substantially axially aligned relative to the wheel axis. A connection between the face portion and rim portion can be formed from second fibres extending from the face portion axially aligned relative to the wheel axis and first fibres extending from the rim portion axially aligned relative to the wheel axis. Preferably, the rim portion includes an edge flange or a lip portion which extends at an angle relative to the axis. In some embodiments, the first fibres of the connection extend from the edge flange portion of the rim portion.

It should be appreciated that the rim portion comprising fibre architecture/layup according to the first aspect of the present invention can be formed by any suitable process. That process can be a manual layup process, an automated layup process or a combination of manual and automated process. In embodiments, a rim portion of a composite can be formed using the following general process steps:

providing an annular mould tool having an annular mould face shaped to provide the designed configuration of the rim portion;

applying at least one close-out ply layer to the annular mould face;

locating connection elements between a face portion lay-up of the composite wheel and the rim-layup of the composite wheel onto the close-out ply applied to the annular mould face;

depositing alternating layers of hoop tow layer and bias ply layer onto the close-out ply and connection elements to form a stacked multilayer structure, thereby forming the rim portion fibre architecture according to the first aspect of the present invention.

It should be appreciated that the close out ply may be a fibre ply sheet or other fibre fabric, or element, or could be formed from hoop tow, as previously discussed.

As noted above, the contours of the rim portion, for example annular safety beads used to retain the inner edges of the tyre in place on the rim portion can be formed using hoop tow windings located and built up into the requite contours and shapes. Furthermore, the inner flange and outer flange of the rim portion is preferably formed by winding the required hoop tow into the requisite locations on the multilayer structure.

The hoop tow can be located in the layup with a pre-applied binder, preferably powder binder. The powder binder is heated, the tow applied to a previous fibre layer and then cooled so that the powder binder acts as a 'tackifier' and the tow is located in the position it is deposited. The tow can be heated via resistive heating.

It is preferred that each of these steps is automated for improved part consistency. Some manual/operator input could be used to set the starting point of tows/plies, or to guide a new layer of bias ply over the layup mandrel and set ply clamps, or the like.

The fibres of the rim portion and/or face portion are preferably injected and/or impregnated with matrix material and then cured and/or set. The method therefore preferably further includes the steps of:

providing a matrix material in contact with each of the layers of the rim portion; and curing the rim portion.

It should be appreciated that curing of the matrix material and the associate part such as the connection, wheel or similar encompasses curing, setting, drying or similar processes.

The composite wheel is preferably formed as a unitary body. This typically involves simultaneous injection and/or impregnation of matrix material and then curing, setting or the like of each portion of the composite wheel. In such embodiments, each of the rim portion and the face portion are preferably at least partially uncured at the time when the connection therebetween is prepared. The method therefore preferably further includes the steps of:

concurrently providing a matrix material in contact with each rim portion and the face portion of the wheel; and co-curing the rim portion and the face portion of the wheel.

Where the matrix material comprises a resin, a variety of resin delivery systems can be used with the method of the second aspect. In some embodiments, at least a part of the resin is provided by Resin Infusion and/or Resin Transfer Moulding and/or Vacuum Assisted Resin Transfer Moulding.

Once moulded and formed into a composite wheel, the rim portion and the face portion and connection therebetween comprise a matrix material, such as resin, metal, and fibres. During lay-up (preparing up to the point before consolidation and/or setting, curing or the like of the matrix material) of a connection, the matrix material need not be comprised in the layers comprising fibres (e.g. a prepreg or semi-preg) or between the layers comprising fibres. However, the matrix material should form a continuous matrix after setting occurs.

The matrix material need not be comprised in or between two adjacent layers comprising fibres. In a preferred embodiment an adhesive may in this case be provided between at least some of such pairs of layers to at least temporarily and at least partially fix the adjacent layers comprising fibres.

The fibres of the connection, rim portion and/or face portion are preferably injected and/or impregnated with matrix material and then cured, set or the like. The connection therefore preferably further comprises a matrix material enveloping the comprising fibres. Any suitable matrix material can be used. In some embodiments, a resin is used. The resin is preferably based on unsaturated polyester, polyurethane, polyvinyl ester, epoxy, thermoplastics, similar chemical compounds or combinations thereof. In a preferred embodiment, the resin is epoxy-based. In other embodiments, the matrix material comprises a metal matrix, forming a composite metal matrix with the fibres when set. The metal matrix material is preferably selected from aluminium, magnesium, titanium, iron and combinations, alloys and mixtures thereof.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
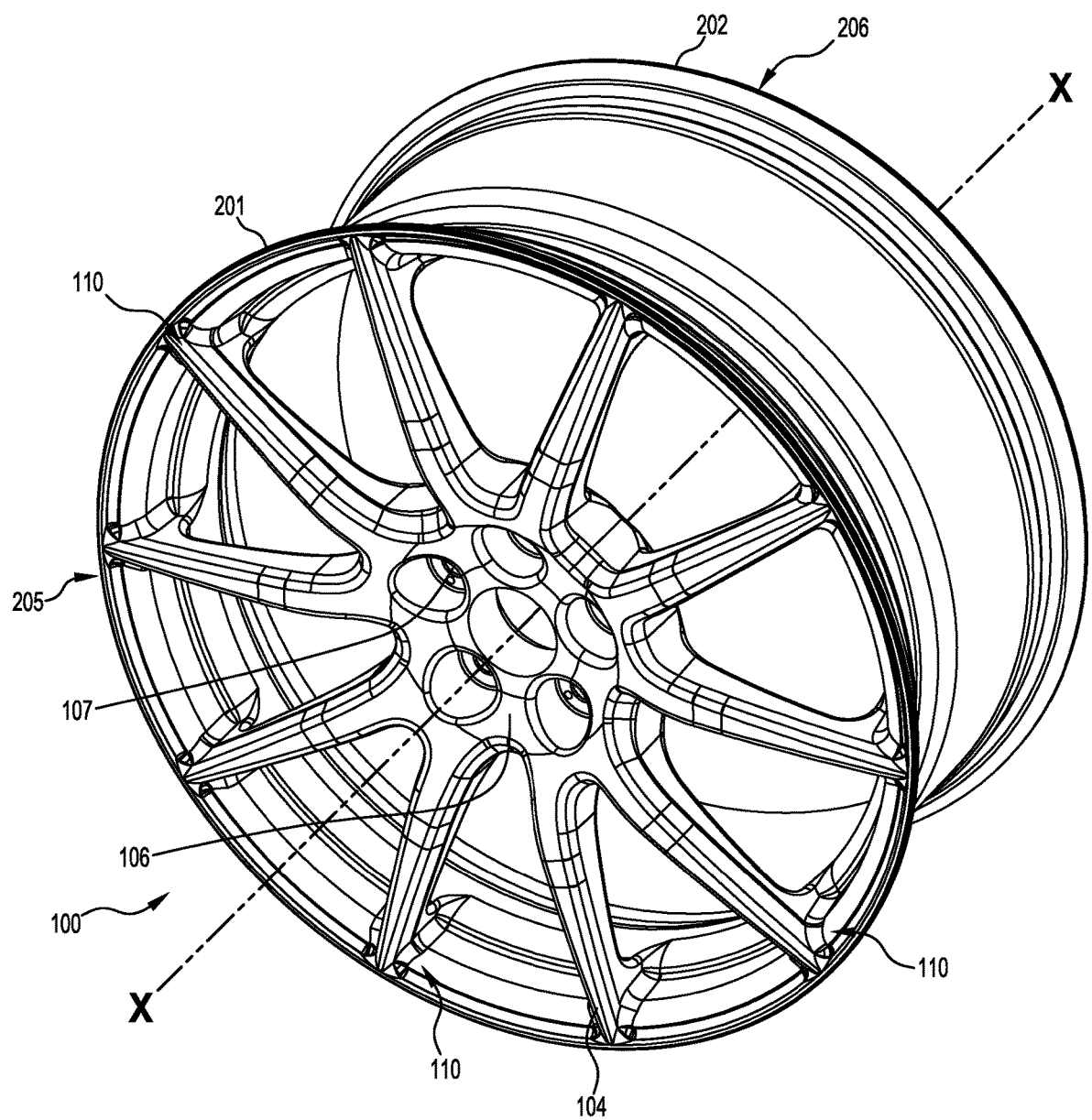
FIG. 1 is a perspective view of a composite wheel including a rim portion according to one embodiment of the present invention.
Figure 2:
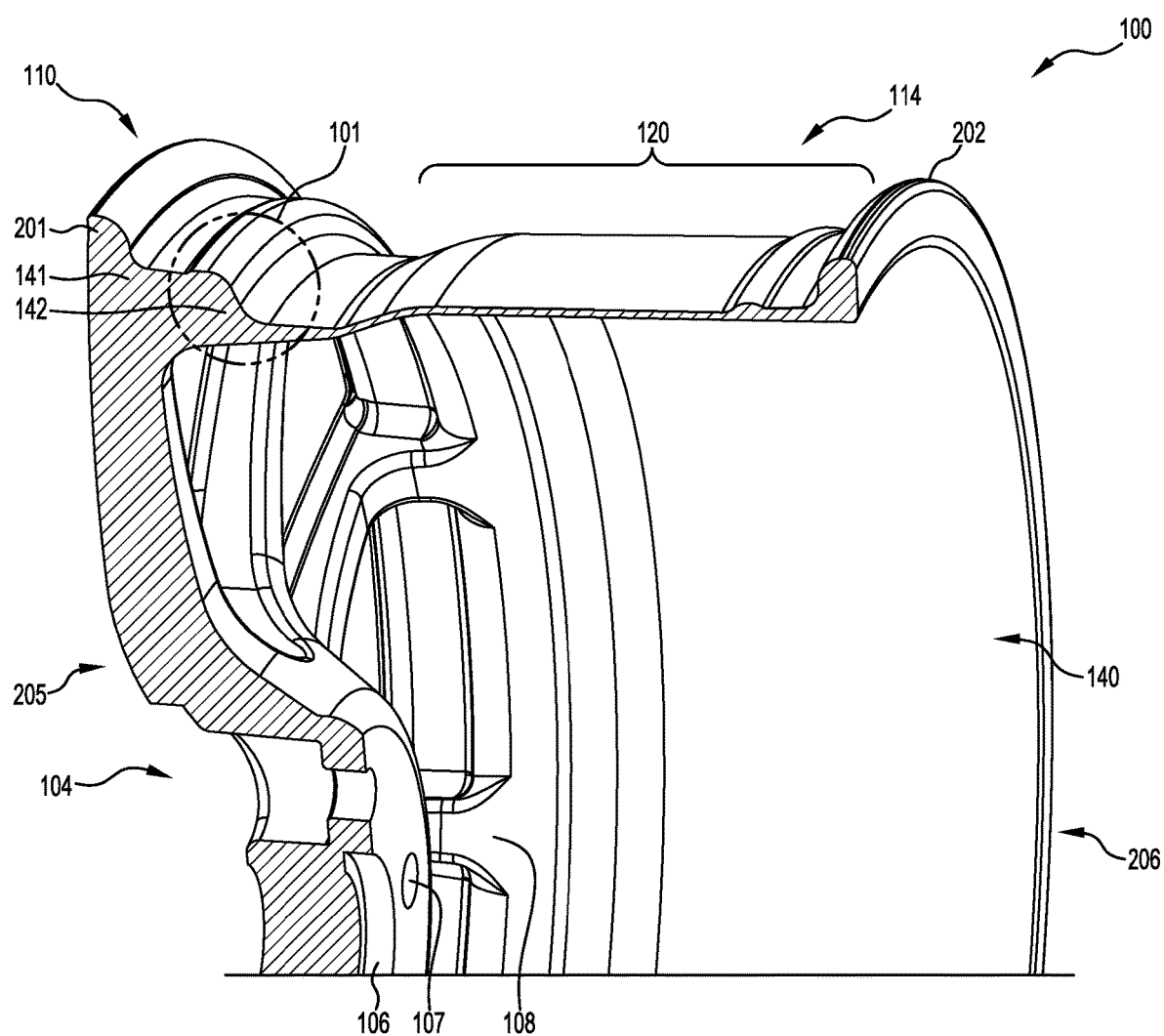
FIG. 2 is a more detailed view of the rim to face connection region of the composite wheel shown in FIG. 1.

Referring firstly to FIG. 1, there is shown a perspective view of a composite wheel 100 which includes a rim portion 102 according to one embodiment of the present invention. The illustrated composite wheel 100 has been developed by the Applicant as an integrally formed one-piece body. The general process of manufacture of the composite wheel 100 is described in International Patent Publication WO2010/024495A1, the contents of which are to be understood to be incorporated into this specification by this reference. It is noted that formation of the rim portion 102 in that publication is superseded for the configuration of the present invention by the details provided in the present application.

The illustrated composite wheel 100 includes two main sections:

A). a rim portion 102 comprises an annulus structure onto which a tyre (not illustrated) is mounted; and B). a face portion 104 comprising a circular hub 106 and a series of spokes 108. The hub 106 includes five fastening apertures 107 configured to receive fastening bolts (not illustrated) used to fix the wheel to a wheel mount of a vehicle. The spokes 108 comprise elongate arms connected to the hub 106 at one end and the rim portion 102 at another end. Whilst a fastening bolt mounting connection is illustrated, it should be appreciated that the hub 106 can be configured for other fastening connections, such as a center mount configuration and other wheel mounting configurations known in the art.

Figure 7:
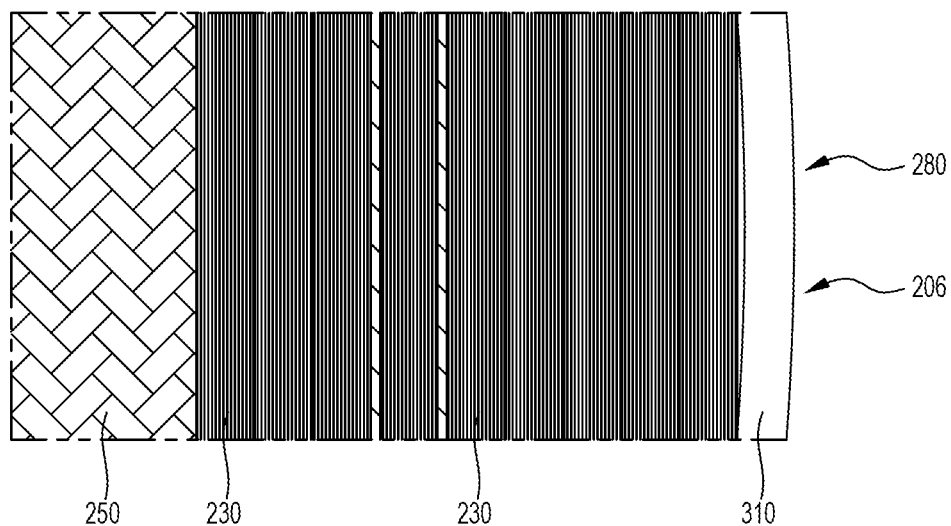
FIGS. 7 to 12 illustrate the progressive fibre layer layup steps in forming the rim portion according an embodiment of the present invention.
Figure 8:
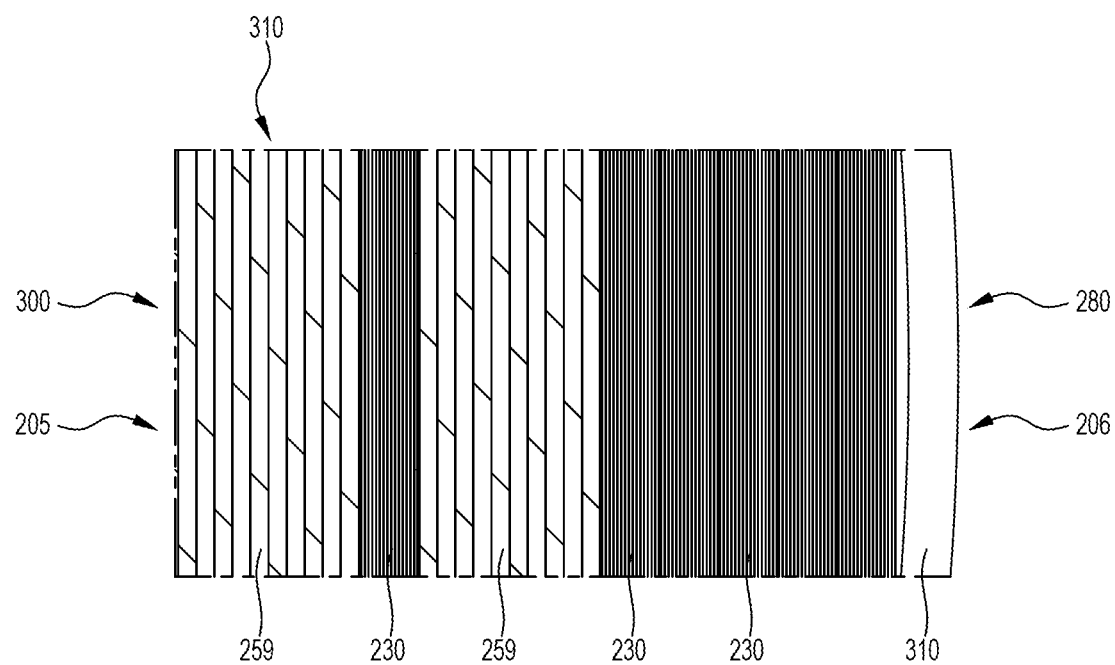

As described in International Patent Publication WO2010/024495A1, the creation of such a one-piece composite wheel 100 necessitates use of a separate rim portion mould (for example 280, 310 in FIGS. 7 to 12) and face portion mould (For example in part shown as 300 in FIG. 8). In use, the face portion 104 is formed by laying up a first set of fibres, typically embodied in a reinforcement fabric seated in the face portion mould. The rim portion mould includes an inner bucket mould and can use, where applicable, an outer cylindrical mould. The rim portion 102 is formed by laying up a second set of fibres typically embodied in a reinforcement fabric seated in the rim portion mould. The reinforcement fabric from the rim portion mould and the face portion mould are assembled together in a combined mould, with the separate portions being interconnected at a connection point 110. A final moulding process is then undertaken in which matrix material, such as a resin can be injected and/or infused into the reinforcement of the overall wheel form to produce a moulded single piece wheel 100.

As will be described below, the method of forming the rim portion 102 and its fibre architecture according to the present invention now differs to that described in WO2010/024495A1. The spoke to rim connection 110 is formed through the interconnection of the rim reinforcement and face reinforcement of the rim portion 102 and face portion 104 of the composite wheel 100 whilst laying up the rim portion 102. The fibre layup of the rim portion is also laid up after the face portion 104 layup is completed so that the connection between the face portion 104 and 102 can be included directly in the fibre layup of the rim portion 102.

FIGS. 3 to 6C show the fibre layup details of a rim portion 102 according to one embodiment of the present invention.

Figure 3:
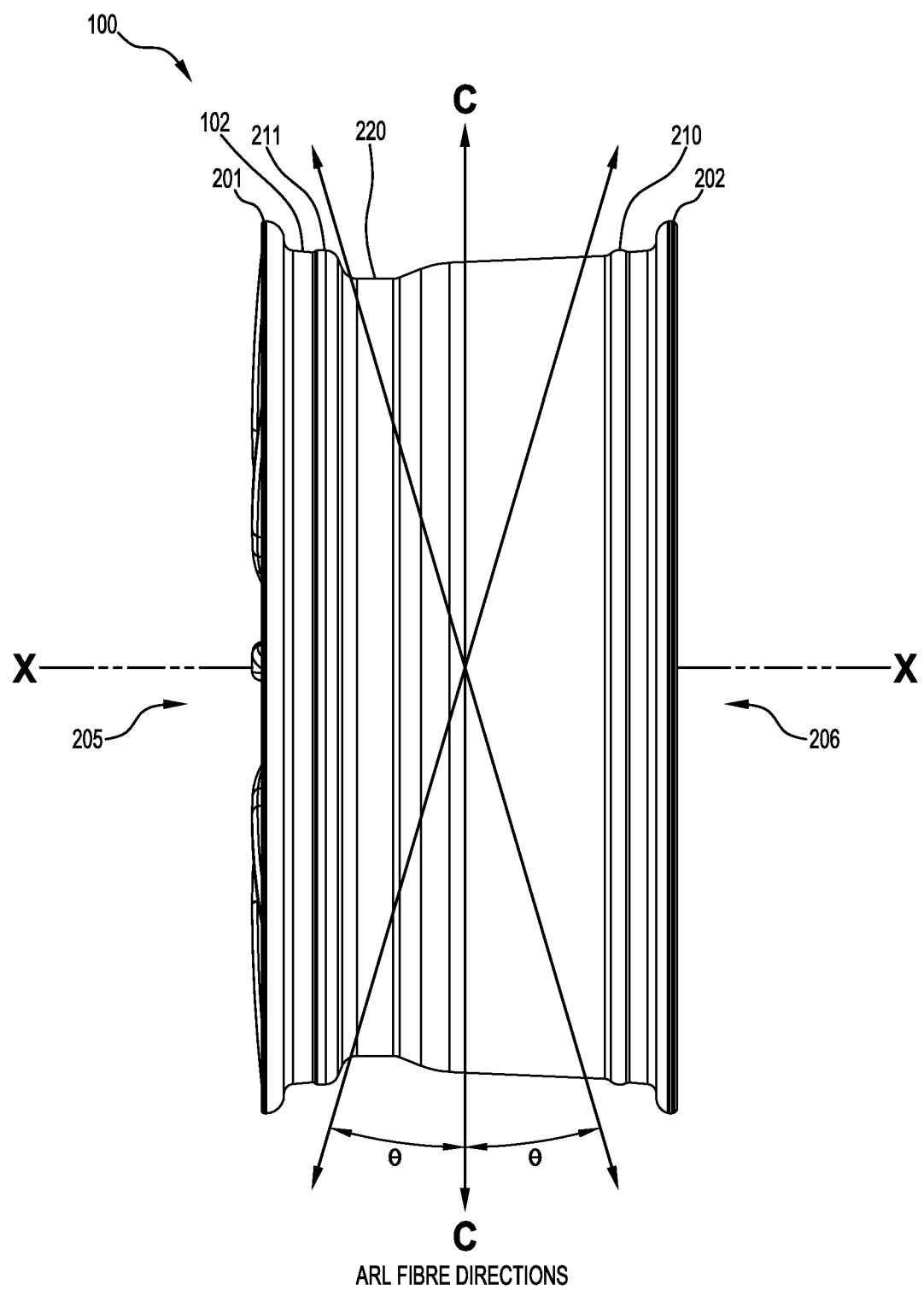
FIG. 3 provides a side view of the rim portion of the composite wheel shown in FIGS. 1 and 2 providing the fibre orientation directions of the rim portion.

The illustrated rim portion 102 comprises an annulus shaped body formed about a central axis of rotation X-X of the composite wheel 100. As shown in FIG. 3, the rim portion 102 also has a circumferential axis C-C extending circumferentially about the central axis X-X and around the rim portion 102. The rim portion 102 has a series of contoured annular features located along the width of that body. The illustrated rim portion 102 firstly includes two annular flanges 201, 202 that radially extend outwardly from or about the distal edges of the rim portion 106. Those flanges 201, 202 comprise an outer flange 201, which is located on the outer edge 205 of the rim portion 102, at or adjacent to the face portion 104 of the composite wheel 100 and an inner flange 202, located on or at the inner edge 206 of the composite wheel 100, which is located closest to the wheel mount of a vehicle (not illustrated) when mounted on a vehicle. The flanges 201, 202 provide the edge stop members which abut and retain the tyre and tyre walls (not illustrated) onto the rim portion 102 and the composite wheel 100. The rim portion 102 also includes two annular beads, comprising an inner safety bead 210 and outer safety bead 211 which are respectively spaced apart from the inner flange 202 and outer flange 201 of the rim portion 102. The safety beads 210, 211 are used to retain the inner edge of the tyre (not illustrated) onto the rim portion 102. In use, the rim of the tyre wall (not illustrated) is seated between the cooperative flange 201, 202 and safety bead 210, 211.

The illustrated rim portion 102 also includes a drop center 220 comprising a recessed or trench portion of the rim portion 102 located in the illustrated embodiment adjacent to but spaced away from the outer safety bead 211. The recess of the drop center 220 assists in the fitment and removal of a tyre from the rim portion by allowing the rim or bead of the tyre (not illustrated) to be pushed into the recess of the drop center 220 while the other side of the tyre is pulled over and off the opposing flange. It should be appreciated that the recess forming the drop center 220 could be positioned anywhere along the width of the rim portion 102, between the two safety beads 210, 211.

FIGS. 4 to 6C provide cross-sectional views of the rim portion 102 providing a view of the fibre layup of the rim portion 102. As shown in those figures, the rim portion 102 is formed as a stacked laminate of at least two different fibre layer compositions stacked as alternating layers in this layup. Those layer compositions are:
(1) a hoop tow layer 230 (labelled 0° hoop and 0° tow bundles in key the provided in FIG. 5(B)) comprising elongate fibre tow (see FIGS. 7 to 12) in which the fibres are substantially aligned with the circumferential axis C-C of the rim portion 102; and
(2) a bias ply layer 240 (labelled +/−33° NCF fabric in the key provided in FIG. 5(B)) comprising at least one sheet of tow or fabric in which the fibres are substantially orientated at an angle of +Θ or −Θ to the circumferential axis of the rim portion. In the illustrated embodiment, Θ is 33°. However, it should be appreciated that Θ could be anywhere from 26° to 40° depending on design considerations.

Each bias ply layer 240 is sandwiched between adjacent hoop tow layers 230 such that each hoop tow layer 230 constrains the adjacent bias ply layer 240 enabling the laminate thickness to be controlled to an extent. The bias ply layers 240 are arranged in the lay up to provide alternating angled fibre directions either side of a hoop tow layer 230. In the illustrated embodiment, consecutive bias ply layers 240 (about a hoop tow layer 230) are therefore arranged in the layup to provide a layer having a fibre orientation angle that is the (+ or −) alternate angle of the fibre orientation of the preceding bias ply layer 240. The resulting laminate stack therefore comprises consecutive layers providing a repetition of [0° (hoop tow layer 230), +Θ° (bias ply layers 240), 0° (hoop tow layer 230), −Θ° (bias ply layers 240)] fibre orientation angles relative to the circumferential axis C-C of the rim portion 102.

The hoop tow layer 230 provides a fibre orientated or aligned with the circumferential axis C-C of the rim portion 102. This provides hoop strength to the rim portion 102 and stiffness in the barrel or annulus shape of the rim portion 102. The bias ply layer 240 provides angled orientated or aligned fibres, providing strength lateral reinforcement to the structure of the rim. The specific angle Θ used is dependent on the overall configuration of the composite wheel and the rim portion and requisite loadings and the like. A key to the line configurations of each of the layers shown in FIGS. 4 to 6C is provided in FIG. 5(B).

The aligned fibres in the hoop tow layer 230 typically provides between 40 to 60% of the fibre direction, preferably about 50% of fibre direction in the rim portion 102. Similarly, the bias ply layer 240 typically provides between 40 to 60% of the fibre direction, preferably about 50% of the fibre direction in the rim portion 102.

Figure 4:
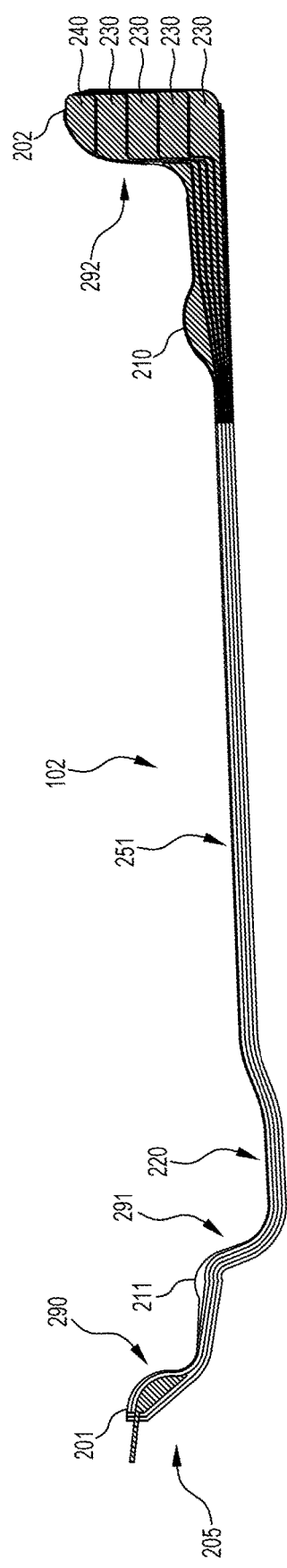
FIGS. 4 to 6C provide a cross-sectional schematic representation of the fibre layer layup of various portions of the rim portion of embodiments of the composite wheel shown in FIGS. 1 to 3. A key to the different layers represented in these Figures is provided in FIG. 5(B).
Figure 6A:
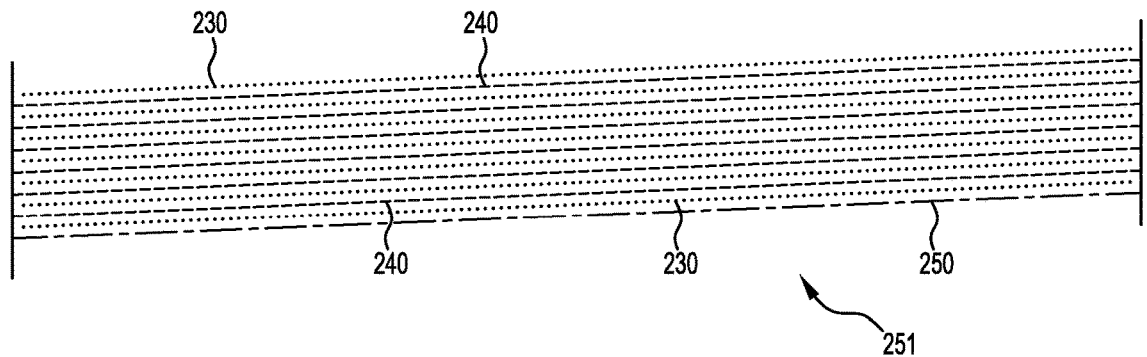

As shown in FIGS. 4 and 6A, the main body 251 of the rim portion 102 is a laminate stack comprises consecutive layers providing a repetition pattern or sequence of the combination of 0°, +Θ° and −Θ° fibre orientation angles relative to the circumferential axis of the rim portion formed from the a hoop tow layer 230 and bias ply layers 240 outlined above. The inner flange 201, the outer flange 202, the inner safety bead 210 and the outer safety bead 211 and drop center 220 of the composite wheel 100 have different layup configurations, described in more detail below.

The actual laid up configuration of each of the layers of the rim portion 102 are best illustrated in FIGS. 7 to 12.

As shown in FIGS. 7 and 8, each hoop tow layer or "hoop wound tow layer" 230 is formed from an annularly wound elongate fibre tow 232 which is wound around the inner bucket mould 310 of rim mould 280. That elongate fibre tow 232 is wound in hoops around the inner bucket mould 310 and along the width thereof to form the desired thickness and contours of each hoop tow layer 230. The resulting layer comprises a series of overlapping and concentric hoops of the elongate fibre tow 232.

Figure 9:
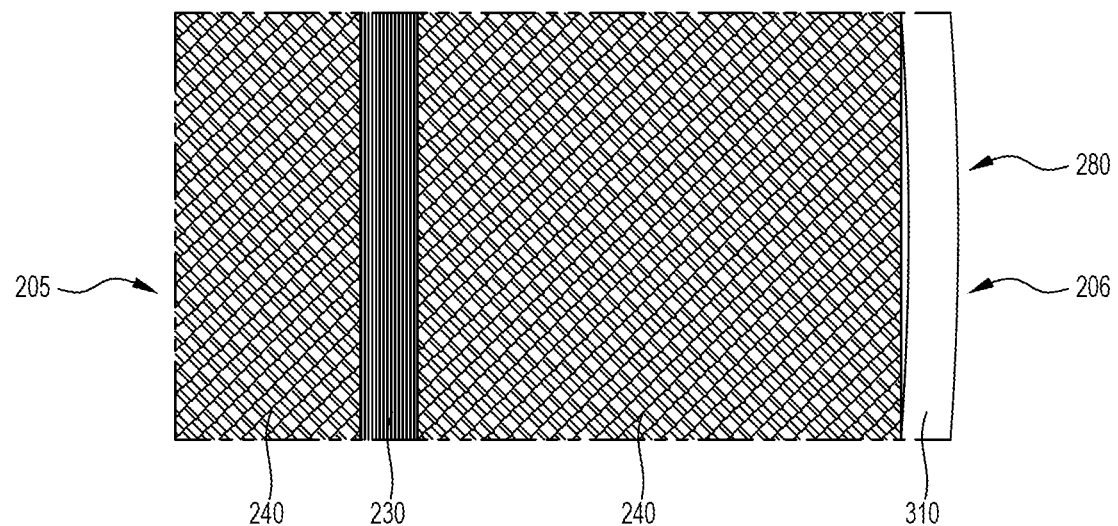
Figure 10:
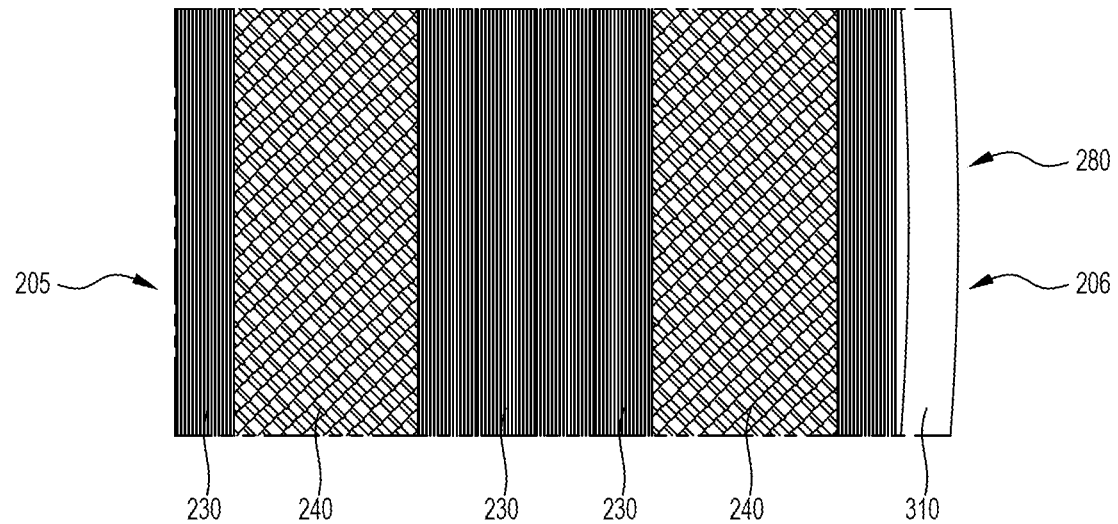

As best illustrated in FIG. 9, the bias ply layer 240 is formed from a sheet 242 of interconnected unidirectional tow that is stitched together to form a sheet. The tow is orientated at the desired angle Θ in the sheet. Typically, a single continuous bias tow sheet 242 is laid up from the inner flange 201 to the outer flange 202 of the composite wheel 100 to form the respective bias ply layer 240. Each bias ply layer 240 can therefore be formed without butt joins. However, in alternate embodiments the bias plies may not be continuous between both flanges 201, 202, and could be laid up as smaller patches that are installed (possibly in overlapping mosaic like formation) to form the requisite layer. The patches may be overlapped.

Figure 5:
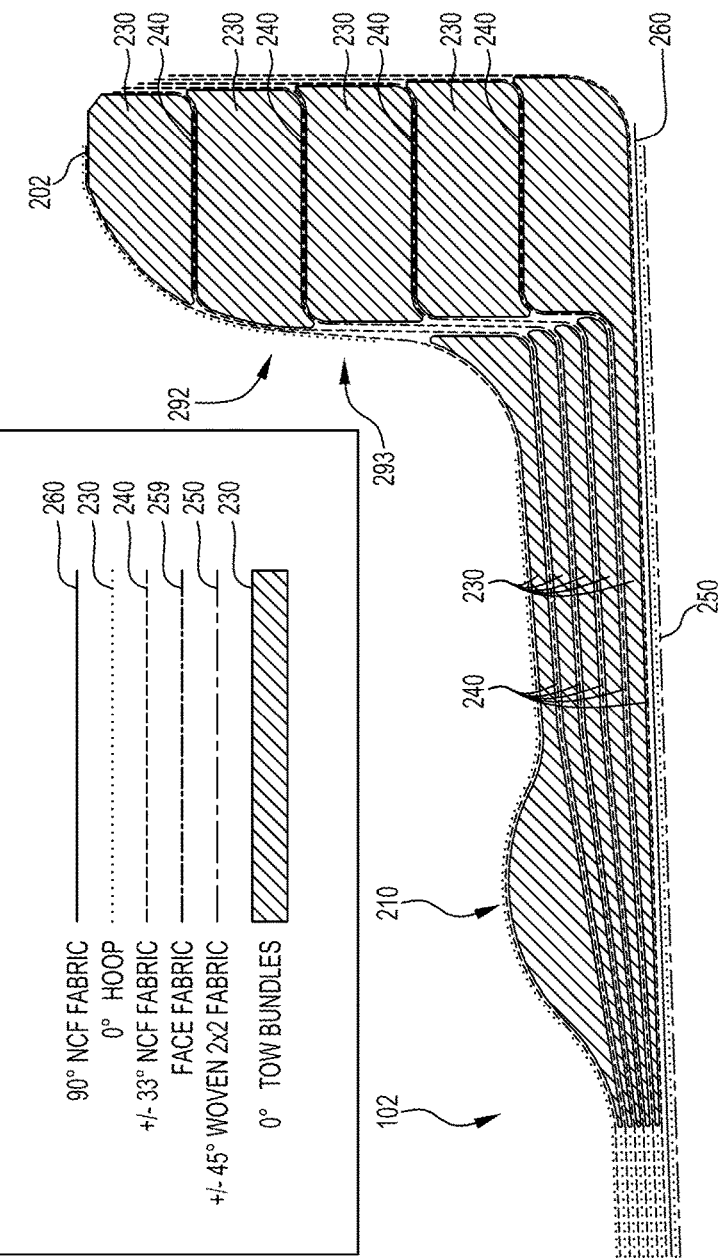
Figure 6B:
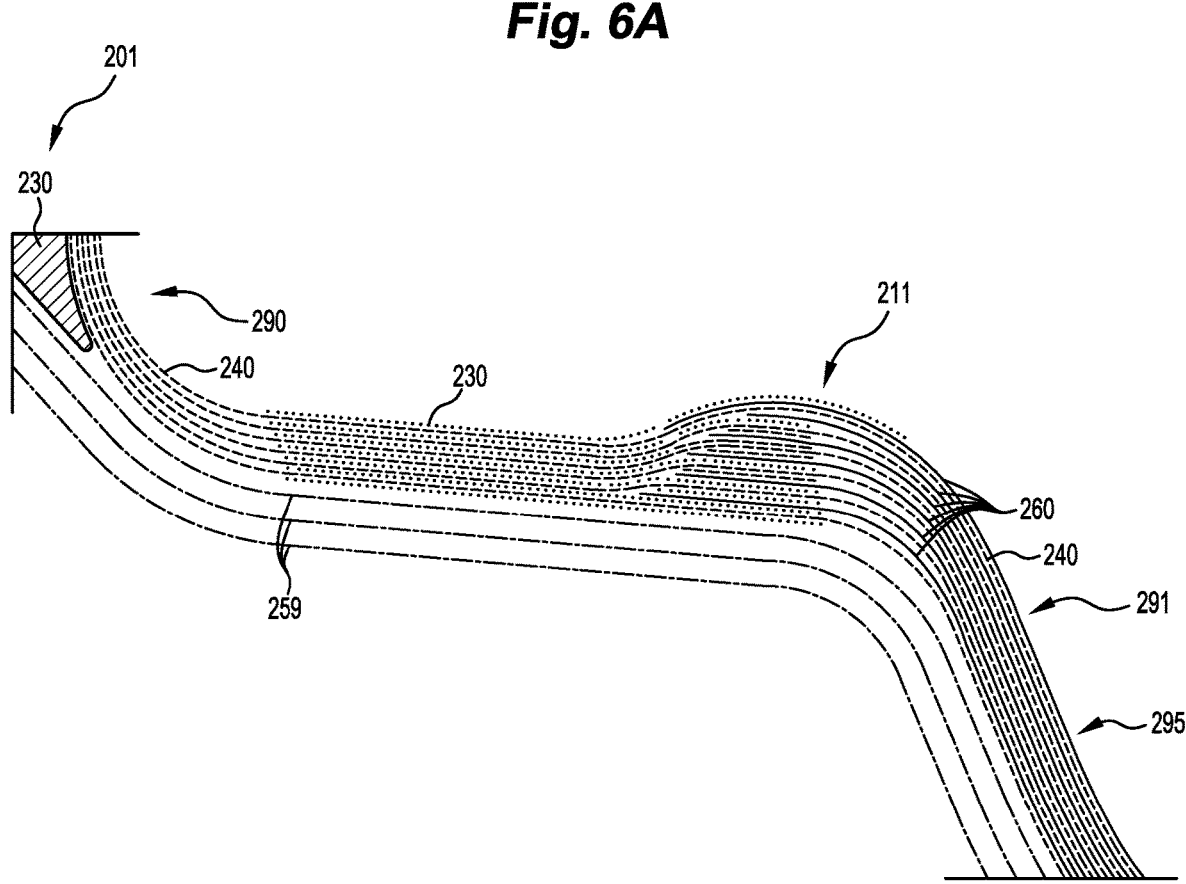

As shown in FIG. 7, a close out ply layer 250 may be used on the inner side of the rim portion 102, which is first applied to the inner bucket mould 310 (of rim mould 280). This closeout ply 250 can comprises a sheet of fabric ply, a layer of hoop tow, a bias ply layer, hoop wound fibreglass tow or combination thereof. The fibre layup of the rim portion 102 can also further include at least one capping layer provided over the final applied hoop tow layer of the fibre layup. The capping layer provides a final layer of reinforcement over the outer surface of the fibre layup, and provides a finishing layer preferably matching the outer surface of adjoining sections of the composite wheel. Like the close out ply layer 250, the capping layer can comprise a sheet of fabric ply, a layer of hoop tow, a bias ply layer, hoop wound fibreglass tow or combination thereof As shown in FIGS. 8 and 6B, the outer end 205 of the layup will also include connection sheets or sections 259 (labelled face fabric in the key provided in FIG. 5(B)) from the fibre layup of the face portion 104 which are integrated in the rim portion layup to securely connect the face portion 104 and rim portion 102 together. As shown in FIG. 6B, these can be part of the base layup from the outer flange 201 through to the drop center 220.

Figure 6C:
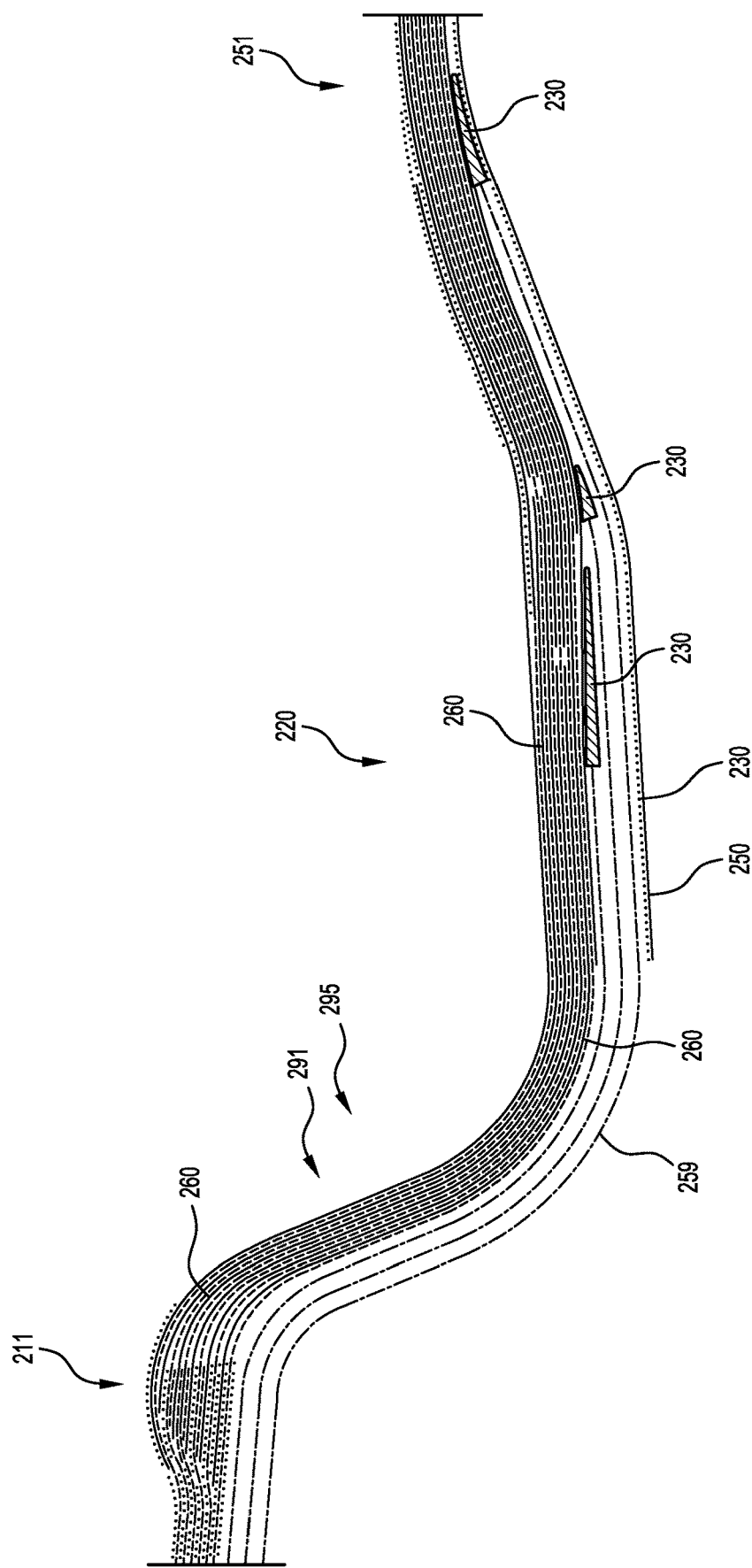

Referring again to FIGS. 4 to 6C, it can be observed that the contoured features of the rim portion are formed from a combination of the contoured configuration of a rim mould (not shown) and from being built up from aggregated hoop wound tow. As shown in FIGS. 5 and 6B and 6C, each of the edge flanges 201 and 202 are built up from an aggregated thickness of hoop wound tow 230. In this respect, the hoop tow layer 230 in each of the edge flanges 201 and 202 locations include additional hoop tow windings to build up the contours of the flange 201, 202. Similarly, the inner safety bead 210 and the outer safety bead 211 are built up from an aggregated thickness of hoop wound tow in one of the hoop tow layers 230.

As shown in FIG. 5, the layup of the inner flange 202 includes reinforcement layers (labelled 90° NCF fabric in the key provided in FIG. 5(B)) 260 comprising a fibre ply having fibres orientated from 80 to 100 degrees to the circumferential axis of the rim portion. In the illustrated case, the reinforcement layers 260 comprise a fibre ply fibre ply having fibres orientated 90 degree to the circumferential axis C-C of the rim portion 102. Those reinforcement layers 260 extend in the layup along the vertical or upright sections 293 of the inner flange 202 and extend through to the main section of the rim to the inner safety bead 210. Such reinforcement layers 260 assist the prevention of cracking of the laminate in this region.

Figure 11:
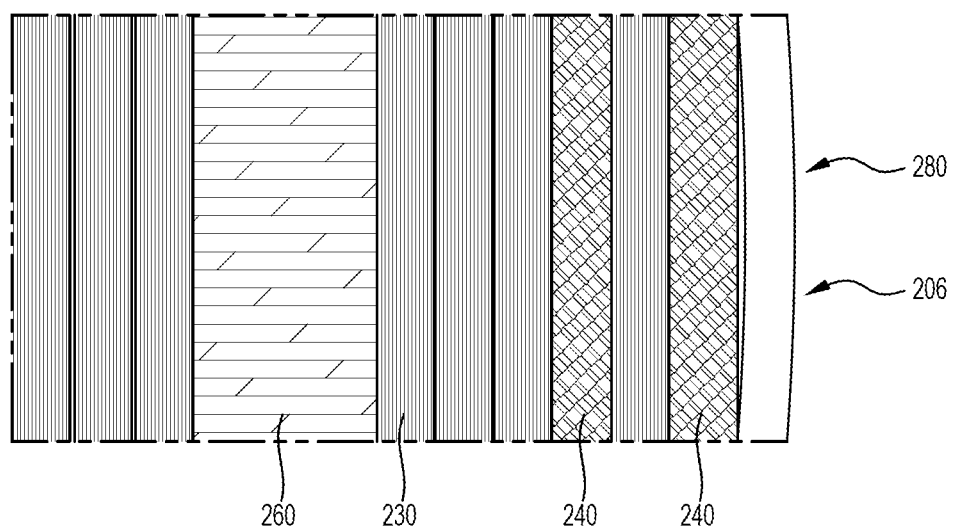
Figure 12:
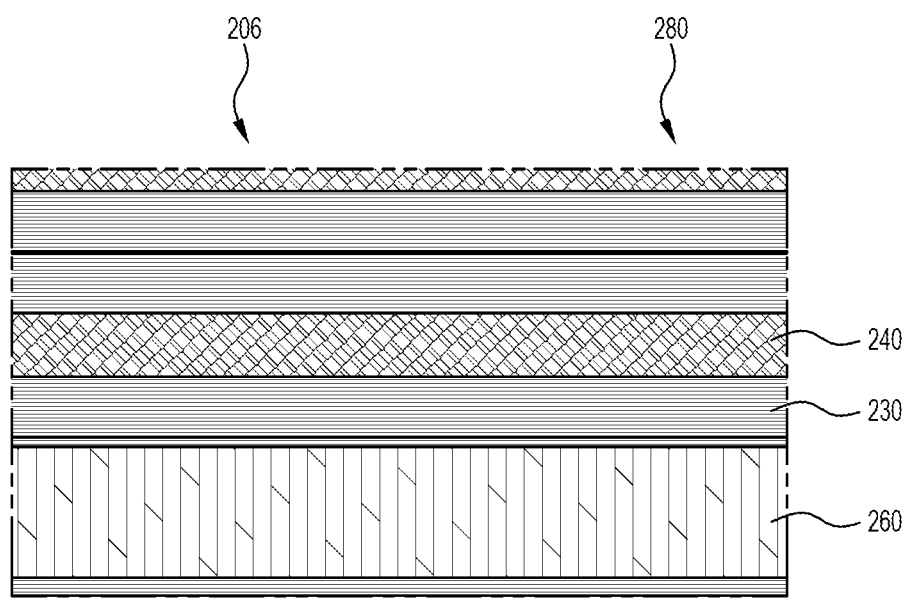

The drop center 220 is formed from a combination of a moulded shape formed in the contoured shape of the rim mould 280 (and comprising inner bucket mould 310), and through selective or reduced application of hoop tow layers in the drop center recess, forming a thinner or reduced thickness in that area. The drop center recess 220 therefore has less hoop tow windings than sections adjacent to the drop center recess 220. As shown in FIGS. 11 and 12, any strength reduction from this lower hoop tow layup can be reinforced through the application of at least one reinforcement layer 260 located in the drop center recess 260. In the illustrated embodiment, this reinforcement layer 260 comprises a fibre ply, typically a fabric formed by stitched tow, having fibres orientated from about 90 degree to the circumferential axis of the rim portion, though it should be appreciated that the fibre alignment could be from 80 to 100 degrees to the circumferential axis C-C of the rim portion 102. As shown in FIG. 6C, reinforcement layers 260 extend in the layup through the drop center 220, up through the vertical or upright sections 295 of the drop center and extend towards the outer flange 201.

Finally, it should be noted that the radially extending sections or flanges (i.e. those sections that are radially extending or aligned with the central axis) of the contoured shape of the rim portion (for example sections 290, 291, 292 in FIGS. 4, 5, 6B and 6C) are formed with reduced or less tow than sections adjacent thereto for lower inter-laminar tension.

The fibre layup or fibre architecture of the rim portion 102 comprises a multi-layered structure. The number of layers may vary considerably depending on the design of the rim portion and the size and type of composite members. In some embodiments, only a few layers, 4 to 10 layer, preferably 4 to 20 layers, for example, 4, 6, 8, 10, 12, 14, 16, 18 or 20 layers are used. In other embodiments, a higher number, for example 20, 30, 50, 100 or more layers are needed to obtain the desired quality and/or properties of the rim portion 102.

It should be appreciated wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these. In a preferred embodiment, the fibres comprise carbon fibres.

The fibre density in each hoop tow layer 230 and bias ply layer 240 can be controlled by forming the various layers out of materials of a selected fibre density. The fibre density in each layer 230, 240 is from 50 to 400 $g/m^2$, preferably from 180 to 250 $g/m^2$, more preferably from 180 to 220 $g/m^2$, yet more preferably about 200 $g/m^2$.

The illustrated composite wheel 100 (FIG. 1) is intended to be formed as a unitary body. This involves simultaneous injection and/or impregnation of a matrix material, which in the exemplary embodiment is a resin, into all parts including the rim portion 102, face portion 104 and connection 110 and then curing of each of the portions of the composite wheel 100. The resin used is preferably epoxy-based. However, it should be understood that any suitable resin can be used for example unsaturated polyester, polyurethane, polyvinyl ester, epoxy, thermoplastics, similar chemical compounds or combinations thereof. A variety of resin delivery systems can be used including, but not limited to Resin Infusion and/or Resin Transfer Moulding and/or Vacuum Assisted Resin Transfer Moulding.

The formed rim portion 102 of the composite wheel 100 therefore also comprises a matrix material enveloping the fibres of the stacked laminate, typically a resin based on unsaturated polyester, polyurethane, polyvinyl ester, epoxy, thermoplastics, similar chemical compounds or combinations thereof. However, it should be appreciated other matrix materials may also be applicable.

In constructing a composite wheel 100 illustrated in FIG. 1, the composite wheel 100 includes two main mould faces. Firstly, a face mould 300, which is generally radially orientated relative to the axis of rotation of the wheel X-X. Secondly, an inner bucket mould 310, which forms the inside face of the rim portion 102 (FIGS. 7 and 8). The inner bucket mould 310 includes a front face forming the back mould wall of the face portion which is radially orientated relative to the axis of rotation of the wheel X-X. The inner bucket mould 310 is substantially axially aligned to the axis of rotation of the wheel X-X.

In use, the face portion 104 is laid up with reinforcement with the connection 110 sections for example connection sections or tabs 260 (FIG. 8).

The rim portion 102 is formed firstly by applying close-out ply or plies (labelled+/−45° woven 2×2 fabric in the key provided in FIG. 5(B)) 250 (if required) to the inner bucket mould 310. The close out ply can comprise a +/−45° biased woven fabric. The inner bucket mould 310 is then combined with the preformed face portion lay-up, face mould 300 as shown in FIG. 8. The connection sections 259 connected with the face portion 104 layup are laid onto the close-out ply or plies 250 and a first hoop tow layer 230 is applied over the close-out ply 250 and part of the connection sections or tabs 259. A bias ply layer 240 is then applied, and then alternate layers of hoop tow layer 230 and bias ply layer 240 to build up the rim portion 102 and contoured features thereof as described above. Advantageously, the hoop tow 230 holds the bias ply 240 in the correct position against the tooling during layup. It is intended that this process would be reasonably automated, with some operator input to set the starting point of tows/plies, or to guide a new layer of bias ply over the layup mandrel and set ply clamps, or the like. During layup, a layer of bias ply or plies 240 is fed onto the rim mould 280 and a layer of tows is hoop wound thereon to encapsulate the bias ply in the layup and form a hoop tow layer 230. A second layer of bias ply or plies 240 (in the opposite bias i.e. fibre angle Θ relative to the circumferential axis C-C) is fed onto the layup so that it covers the previous layer of tows 230. That bias ply layer 240 is then covered with a layer of tows hoop wound thereon to encapsulate the bias ply 230 in the layup and form a hoop tow layer 230. This is repeated until the required laminate thickness is achieved.

The resulting rim layup is a stacked laminate formed from a combination of hoop tows (hoop tow layer 230) and bias plies 240 arranged around the face layup, face mould 300 and bucket mould 301. This stacked laminate is presented to a resin injection station (not illustrated) where a vacuum source and resin injection head are connected to a tool assembly and resin is injected and/or impregnated under pressure into a cavity containing the layup. The resin permeates the fibre of the stacked laminate and cures to form a laminated wheel. After demould, the unfinished moulded wheel can undergo finishing procedures (further drilling, surface finishing, coating and the like).

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A rim portion of a composite wheel of a vehicle, the rim portion comprising a shaped annulus formed about a central axis of rotation of the composite wheel and having a circumferential axis extending circumferentially about the central axis and around the rim portion, said rim portion comprising a main body and a drop center recess, said rim portion having a fibre layup pattern comprising a stacked laminate formed from alternating layers of:
    a hoop tow layer comprising elongate fibre tow in which fibres of the elongate fibre tow are substantially aligned with the circumferential axis of the rim portion, the hoop tow layer being formed from at least one annularly wound elongate fibre tow; and
    a bias ply layer comprising at least one fibre ply in which fibres of the at least one fibre ply are substantially orientated at an angle of +Θ or −Θ to the circumferential axis of the rim portion, wherein Θ is from 26° to 40°;
    wherein the drop center recess comprises an annular section that is radially extending relative to the central axis, the annular section having reduced or less tow than the main body, the fibre layup pattern in the annular section of the drop center recess including at least one reinforcement layer comprising a fibre ply having fibres orientated from 80 to 100 degrees to the circumferential axis of the rim portion.

2. The rim portion of a composite wheel according to claim 1, wherein Θ is from 28° to 40°.

3. The rim portion of a composite wheel according to claim 1, wherein the hoop tow layer comprises between 40 to 60% of fibre in the rim portion.

4. The rim portion of a composite wheel according to claim 1, wherein the bias ply layer comprises between 40 to 60% of fibre in the rim portion.

5. The rim portion of a composite wheel according to claim 1, wherein consecutive bias ply layers are arranged in the fibre layup pattern to provide a layer having a fibre orientation angle that is the (+ or −) alternate angle of the fibre orientation of the preceding bias ply layer.

6. The rim portion of a composite wheel according to claim 1, wherein the bias ply layer comprises a sheet of interconnected unidirectional fibre material.

7. The rim portion of a composite wheel according to claim 1, wherein the bias ply layer comprises a two layer bias ply comprising a layer having fibre directions of +(26° to 40°) and a layer having fibre directions of −(26° to 40°).

8. The rim portion of a composite wheel according to claim 1, wherein the rim portion includes two annular flanges, an inner flange and an outer flange at opposing edges of the width of the rim portion, and wherein each bias ply layer comprises a continuous sheet from the inner flange of the wheel to the outer flange of the wheel.

9. The rim portion of a composite wheel according to claim 1, wherein the bias ply layer is sandwiched between adjacent hoop tow layers.

10. The rim portion of a composite wheel according to claim 1, wherein each bias ply layer is formed without butt joints.

11. The rim portion of a composite wheel according to claim 1, wherein the stacked laminate further comprises contoured features formed from aggregated hoop wound tow, the contoured features extending around the circumference of the rim portion and being built up from annularly wound elongate fibre tow, and wherein the contoured features include at least one bead, flange, rib, or step.

12. The rim portion of a composite wheel according to claim 1, wherein one or more sections of the rim portion, other than in the annular section of the drop center recess, are radially extending relative to the central axis and comprise reduced or less tow than sections adjacent thereto.

13. The rim portion of a composite wheel according to claim 1, wherein the rim portion includes two annular flanges, an inner flange and an outer flange, at opposing edges of the width of the rim portion, and wherein the fibre layup pattern of at least one of the inner flange or outer flange includes a reinforcement layer comprising a fibre ply having fibres orientated from 80 to 100 degrees to the circumferential axis of the rim portion.

14. The rim portion of a composite wheel according to claim 1, wherein the fibre density in each layer of the stacked laminate is from 50 to 400 g/m2.

15. The rim portion of a composite wheel according to claim 1, further including a closeout ply layer on at least one outer side of the stacked laminate, wherein the closeout ply layer comprises a sheet of fabric ply, a layer of hoop tow, a bias ply layer, hoop wound fibreglass tow or combination thereof.

16. The rim portion of the composite wheel of claim 1, further comprising at least one hoop tow layer over at least a portion of the at least one reinforcement layer.

17. The rim portion of a composite wheel according to claim 1, wherein the fibres comprise carbon fibres.

18. The rim portion of a composite wheel according to claim 1, further comprising a matrix material enveloping the fibres of the stacked laminate, wherein the matrix material comprises a resin based on unsaturated polyester, polyurethane, polyvinyl ester, epoxy, thermoplastics, similar chemical compounds or combinations thereof.

19. A composite wheel including a rim portion according to claim 1.

20. The rim portion of the composite wheel according to claim 1, further comprising at least one of: an inner flange at one edge of a width of the rim portion, and an outer flange at an edge of the width of the rim portion opposite the inner flange, wherein a fibre layup pattern of the inner flange, the outer flange, or a combination thereof, is different from the main body fibre layup pattern.

21. The rim portion of the composite wheel according to claim 20, further comprising at least one of: an inner safety bead spaced from the inner flange and an outer safety bead spaced from the outer flange, wherein a fibre layup pattern of at least one of the inner safety bead and the outer safety bead is different from the main body fibre layup pattern.

22. The rim portion of the composite wheel according to claim 1, wherein the main body layup pattern, not including any optional closeout ply or capping layer, consists of plies of:

the hoop tow layer comprising the elongate fibre tow in which fibres of the elongate fibre tow are substantially aligned with the circumferential axis of the rim portion, the hoop tow layer being formed from at least one annularly wound elongate fibre tow; and the bias ply layer comprising the at least one fibre ply in which fibres of the at least one fibre ply are substantially orientated at an angle of +Θ or −Θ to the circumferential axis of the rim portion, wherein Θ is from 26° to 40°.

23. The rim portion of the composite wheel according to claim 16, wherein the at least one hoop tow layer provided over the at least one portion of the reinforcement layer in the annular section of the drop center recess is disposed over at least one or both ends of the reinforcement layer.

24. The rim portion of the composite wheel of claim 12, further comprising at least one hoop tow layer over at least a portion of the reinforcement layer in the one or more sections of the rim portion, other than in the annular section of the drop centre recess, that are radially extending relative to the central axis and comprise reduced or less tow than sections adjacent thereto.

25. The rim portion of the composite wheel of claim 23, further comprising an outer flange at an edge of the width of the rim portion and an outer safety bead spaced from the outer flange between the outer flange and the radially extending annular section of the drop centre recess, wherein the at least one reinforcement layer extends through the drop centre recess, through the radially extending annular section of the drop centre recess, through the outer safety bead, and towards the outer flange.

* * * * *